(12) United States Patent
Iden

(10) Patent No.: US 8,215,239 B2
(45) Date of Patent: Jul. 10, 2012

(54) AERODYNAMIC PSEUDOCONTAINER FOR REDUCING DRAG ASSOCIATED WITH STACKED INTERMODAL CONTAINERS

(75) Inventor: Michael E. Iden, Kildeer, IL (US)

(73) Assignee: Union Pacific Railroad Company, Omaha, NE (US)

( * ) Notice: Subject to any disclaimer, the term of this patent is extended or adjusted under 35 U.S.C. 154(b) by 440 days.

(21) Appl. No.: 12/394,609

(22) Filed: Feb. 27, 2009

(65) Prior Publication Data

US 2010/0218699 A1 Sep. 2, 2010

(51) Int. Cl.
*B61D 17/00* (2006.01)
*B60J 9/00* (2006.01)
(52) U.S. Cl. ...................................... 105/1.1; 296/180.1
(58) Field of Classification Search ................... 105/1.1, 105/1.2, 1.3; 296/180.1, 180.2, 180.4; 180/903
See application file for complete search history.

(56) References Cited

U.S. PATENT DOCUMENTS

| | | | |
|---|---|---|---|
| 2,253,209 A | 8/1941 | Patton | |
| 3,797,879 A | 3/1974 | Edwards | |
| 4,508,380 A | 4/1985 | Sankrithi | |
| 4,702,509 A * | 10/1987 | Elliott, Sr. | 296/180.4 |
| 4,756,256 A * | 7/1988 | Rains et al. | 105/1.1 |
| 4,966,407 A * | 10/1990 | Lusk | 296/180.1 |
| 5,000,508 A | 3/1991 | Woods | |
| 5,465,669 A * | 11/1995 | Andrus | 105/1.1 |
| 5,562,374 A | 10/1996 | Plamper | |
| 7,380,868 B2 | 6/2008 | Breidenbach | |
| 7,784,409 B2 * | 8/2010 | Iden et al. | 105/1.1 |
| 2003/0070577 A1 | 4/2003 | Smith | |
| 2005/0279241 A1 | 12/2005 | Roop | |

* cited by examiner

*Primary Examiner* — S. Joseph Morano
*Assistant Examiner* — R. J. McCarry, Jr.
(74) *Attorney, Agent, or Firm* — Pillsbury Winthrop Shaw Pittman LLP

(57) ABSTRACT

Disclosed is an aerodynamic pseudocontainer for a train. The pseudocontainer is configured to be stacked atop an intermodal container in a lead container car at a lead end of the train, so that its aerodynamic configuration reduces drag when the train is in motion, thereby reducing fuel costs and emissions. The pseudocontainer may have connectors on its bottom so that when it is placed on top of the intermodal container, locking devices may be used for attachment.

19 Claims, 11 Drawing Sheets

US 8,215,239 B2

AERODYNAMIC PSEUDOCONTAINER FOR REDUCING DRAG ASSOCIATED WITH STACKED INTERMODAL CONTAINERS

BACKGROUND

1. Field of Invention

The present invention is generally related to reducing aerodynamic drag on stacked intermodal containers.

2. Description of Related Art

Generally the use of stacked (or "double stacked") intermodal containers, wherein a top container is mounted on a bottom container, is known as a method of transporting goods on rail. For example, as shown in FIG. 1 and further described in detail below, a series 104 of stacked intermodal containers may be provided on container cars 113 and pulled by a locomotive 102 along a track 103 to form a train used for transporting goods on land. Though transporting intermodal containers in a double stack assists in lowering rail haul costs, it would be beneficial to further reduce such costs associated with rail transportation. For example, the expenses associated with operating a fuel (e.g., diesel) powered locomotive may significantly increase based on rising fuel prices. Additionally, exhaust emissions of diesel fuel may cause damage and be harmful to the environment.

In some instances, such as shown in U.S. Pat. Nos. 4,702,509 and 5,000,508, it has been known to attach inflatable devices to vehicles to assist in reducing aerodynamic drag. However, these known devices tend to achieve low reductions in aerodynamic drag, and fail to provide a device that is versatile and may be used with different sized containers in a train.

SUMMARY

One aspect of the invention provides an aerodynamic pseudocontainer for reducing aerodynamic drag associated with a train. The pseudocontainer includes: a body configured to be stacked atop an intermodal container. A bottom portion of the body is configured to be stacked and aligned atop the intermodal container. A plurality of connectors for connecting the body to the intermodal container are also provided, which are configured to be substantially aligned with corner fittings of the intermodal container. The body of the pseudocontainer has an aerodynamic configuration for reducing drag when the train is in motion.

Another aspect of the invention relates to a train having a locomotive and a plurality of container cars. The locomotive has track engaging wheels for pulling the train along a pair of tracks and is located at a lead end of the train. The plurality of container cars are coupled rearward of the locomotive. Each container car has track engaging wheels, and one or more of the container cars has a set of intermodal containers stacked one atop each other. The plurality of container cars include a lead container car positioned proximate the locomotive, which has a single intermodal container and an aerodynamic pseudocontainer stacked atop the intermodal container. The aerodynamic pseudocontainer extends higher than the locomotive and has an aerodynamic configuration for reducing drag as the train is pulled forwardly by the locomotive.

In another aspect of the invention, a method of reducing aerodynamic drag of a train is provided. The train may have a locomotive and a plurality of container cars. The locomotive is located at a lead end of the train and has track engaging wheels for pulling the train along a pair of tracks. The plurality of container cars are coupled rearward of the locomotive. Each container car has track engaging wheels, and one or more of the container cars has a set of intermodal containers stacked one atop each other. The plurality of container cars include a lead container car positioned proximate the locomotive. The method includes: providing the lead container car with a single intermodal container; and stacking an aerodynamic pseudocontainer atop the intermodal container. The aerodynamic pseudocontainer extends higher than the locomotive and has an aerodynamic configuration for reducing drag as the train is pulled forwardly by the locomotive.

Other objects, features, and advantages of the present invention will become apparent from the following detailed description, the accompanying drawings, and the appended claims.

BRIEF DESCRIPTION OF THE DRAWINGS

FIG. 3b illustrates a detailed view of a connection of the aerodynamic pseudocontainer and container of FIG. 2 using the corner locking device of FIG. 3a;

FIG. 8b illustrates a detailed view of a connection of the aerodynamic pseudocontainer and container of FIG. 7 using the locking device of FIG. 8a;

DETAILED DESCRIPTION OF THE PREFERRED EMBODIMENT(S)

It is a goal of the present invention to reduce the amount of aerodynamic drag and vortices created among a series of stacked intermodal containers during transportation. Though intermodal containers are designed to be used in more than one form of transportation, e.g., railway, waterway, or highway, the embodiments below are herein described pertaining to their use on a railway.

Figure 1:
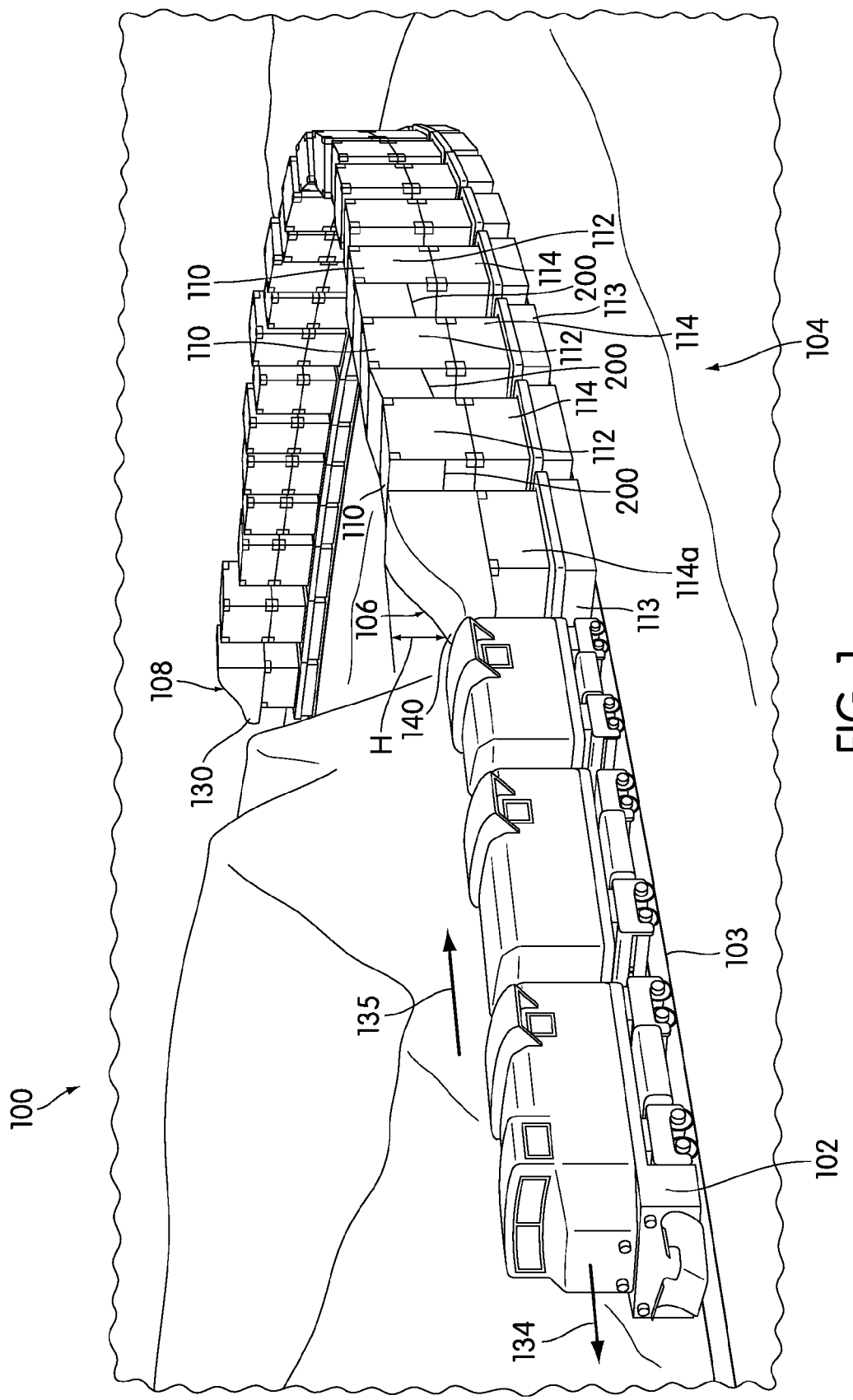
FIG. 1 illustrates a train comprising a locomotive pulling a series of stacked intermodal containers including an aerodynamic pseudocontainer in accordance with an embodiment of the present invention.

Referring now more particularly to the drawings, FIG. 1 illustrates a train 100 comprising a locomotive 102 pulling a series 104 of intermodal containers. The locomotive 102 is located at a lead end of the train 100. The locomotive 102 may be a vehicle that is diesel-powered via a power source to pull the series 104 of intermodal containers mounted on container cars 113 on railroad tracks or rails 103, as is known in the art. As shown, the series 104 has at least a plurality of stack or container cars 113 coupled rearward of the locomotive 102.

The container car 113, also known as a double stack car or a well car, is a railroad car that is designed to carry intermodal containers. One or more of the container cars 113 may comprise a set of intermodal containers 112, 114 stacked one atop the other therein. In some cases, a plurality of sets 110 of stacked intermodal containers may be provided in the train 100. The container cars 113 are connected in series and are moved (pulled or pushed) by one or more locomotives 102. The container cars 113 comprise a well and track engaging wheels for moving along the track 103. Container cars 113 may be connected in the train 100 via coupling mechanisms, as generally known.

Each set of intermodal containers may comprise a top container 112 stacked or mounted on a bottom container 114, also referred to herein as a double stack. The mounting and/or locking of top and bottom containers 112 and 114, respectively, to each other in a stack is generally known in the art, as is discussed further below. It is noted that a container, as herein described, is defined as a box container, bulk container, tank, or other storage device comprising a structure or frame that allows for stacking and mounting on top of one another. Generally such containers are also referred to as "ISO containers," as they are manufactured according to specifications from the International Standards Organization (ISO) and are suitable for multiple transportation methods such as truck and rail, or rail and ship. For example, a known standard for such containers is ISO 1496. In an embodiment, each of the containers 112 and/or 114 comprises a top wall 116, a bottom wall 118, front wall 120, back wall 122, and side walls 124 to form an enclosed box, for example. In some cases, the walls 116-124 may be connected by a frame (not shown). The containers as described herein may comprise various sizes and features. As generally known in the art, the side walls may comprise doors or openings allowing access to contents being held therein. The doors may be provided on a back wall, near the rear of the container, near the front of the container, on the sides of the container, or even access via the top of the container. Alternatively, a top wall may not be included. The dimensions or sizes of the containers should also not be limiting. For example, standard ISO shipping containers comprising dimensions of 40 to 53 feet long, 8 feet to 9 feet 6 inches high, and 8 feet wide may be used for transportation. Additionally, the type of product held by the containers should not be limiting. For example, though a box container is generally described herein, the device may be used with bulk containers typically 20 to 28 feet long and/or tanks designed to hold liquids with a holding capacity of 4000-6000 gallons.

Also, each of the containers may also facilitate stacking. Each intermodal container also comprises fittings 125 at each corner, sometimes referred to as "corner fittings" in the art, comprising a plurality of connection openings 125a or apertures, such as shown in detail in FIGS. 3a-3b and 8a-8b, also formed according to ISO standards. The "corner fittings" 125 are defined as fittings provided at a corner where the top wall 116/bottom wall 118 and side walls 124 meet. They may also be at a corner where the top wall 116/bottom wall 118, sides 124 and end walls 120/122 meet;, however, that is not necessary. For example, in a standard 40 foot ISO container, the corner fittings 125 are provided at the corners defined by a meeting of the top 116/bottom 118, side 124, and end walls 120/122. In a larger container, however, such as a 53 foot ISO container, the corner fittings 125 are provided at the corners defined at the meeting of the top 116/bottom 118 and side walls 124, but are spaced inwardly from the end walls 120/122.

The connection openings 125a of the fittings 125 are commonly used to connect or releasably lock the top container 112 to the bottom container 114 when mounted on each other to form a stack/double stack, for example. The connection openings 125a may also be used to lift a container. The connection openings 125a of the corner fittings 125 comprise an opening, hole, or aperture for receiving a securing, clamping, or connecting device. The opening, hole, or aperture 125a may be circular, oval, or any other shape, although they are typically elongated in shape. The corner fittings 125 are also designed to meet ISO standards and/or specifications. For example, as noted above, the corner fittings 125 may be provided directly in a corner where a top wall 116, front wall 120, and side wall 124 meet, or provided adjacent to near where such walls may meet (such as is the case with larger containers, e.g., 48 feet or 53 feet long, wherein corner fittings 125 may be provided a distance from the corner of the container). Generally it is known in the art that such corner fittings 125 are provided on the containers at specific/similar locations, no matter their ISO dimensions, so as to allow for their ease of stacking and intermodal transport. Also, the corner fittings 125 may be made from a number of materials including, but not limited to, aluminum, stainless steel, and carbon steel. Generally, at least eight (8) corner fittings 125 are provided on a container (two top right, two top left, two bottom right, two bottom left).

Figure 3A:
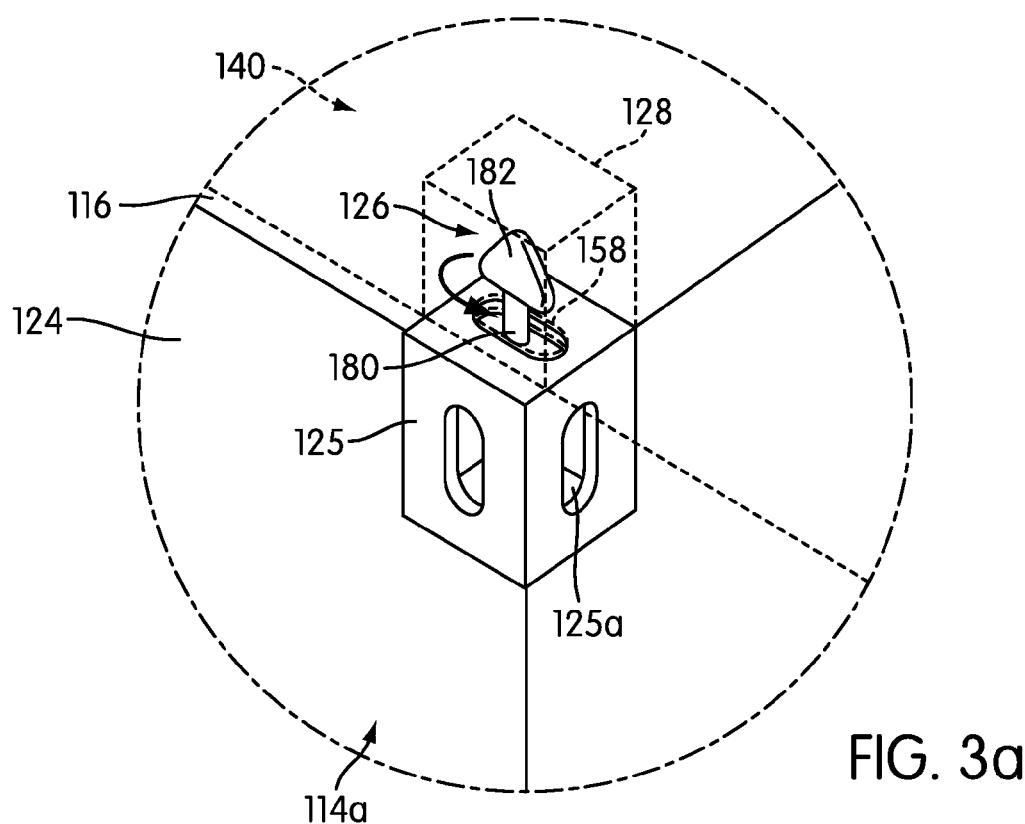
FIG. 3a illustrates a detailed view of a corner locking device for securing the aerodynamic pseudocontainer of FIG. 2 to a container in accordance with an embodiment of the present invention.
Figure 8A:
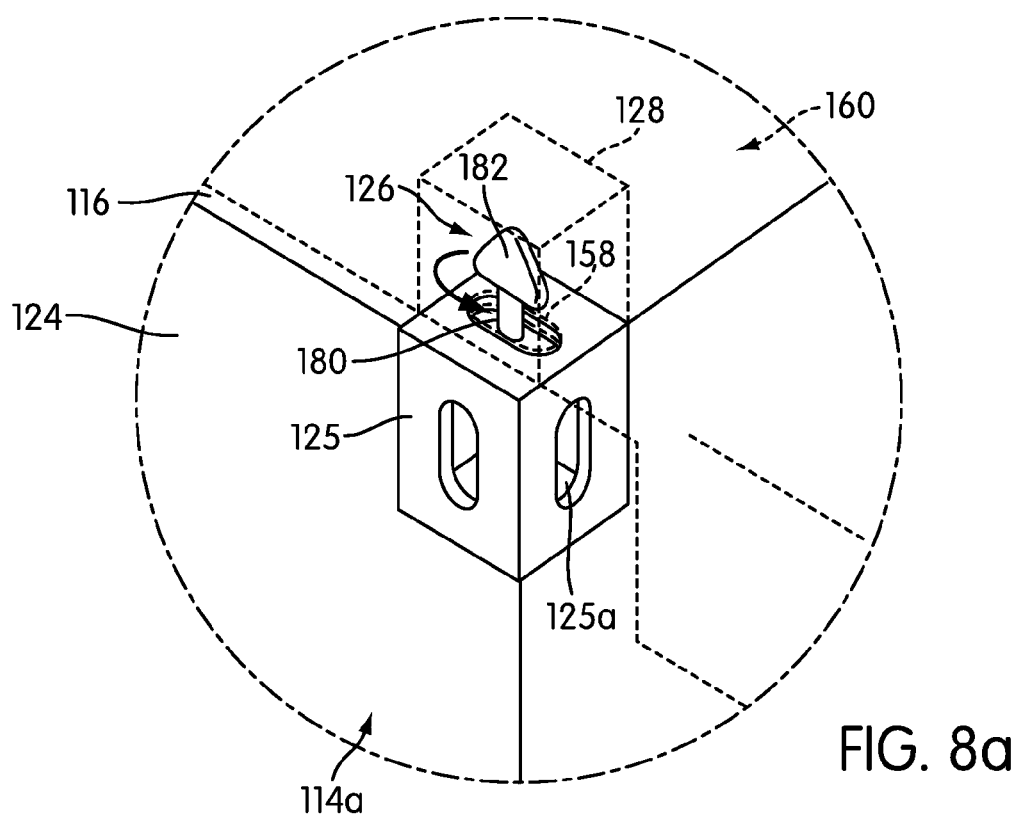
FIG. 8a illustrates a detailed view of a locking device for securing the aerodynamic pseudocontainer of FIG. 7 to a container in accordance with an embodiment of the present invention.

In order to lock two intermodal containers together (or lock a container to a railcar such as container car 113, or lock a lift to a container), it is commonly known to use locking devices or coupling devices which may be known as interbox connectors (IBCs) or twist locks, such as represented by element 126 in FIGS. 3a and 8a. Devices such as IBCs and twist locks are safety locking mechanisms and may be manually or automatically actuated. These locking devices are designed to be inserted into the elongated connection openings 125a of corner fittings 125 of a top and bottom container 112 and 114, for example, and in some cases are twisted or rotated to lock a head portion within the connection opening 125a. Specifically, the locking device has a shaft with an elongated head that aligns with and is inserted into an opening 125a (further described below). The head is then pivoted out of alignment with opening 125a to prevent its withdrawal and provide the locking action. The locking devices may have another head or alignment device on its opposite end, so as to lock the body with respect to the hole of the corner fitting 125. Other container connector clamps, coupling devices, or locking devices that are known in the art may also be used alone or in combination with other locking devices (e.g., tie downs). Such devices may manually or automatically latch or lock in the corner fittings 125. The locking devices may be made of any number of materials, such as steel or galvanized steel, and are not designed to be limiting. As will be described with respect to FIGS. 3a-3b and 8a-8b, in accordance with an embodiment, a plurality of locking devices 126 such as IBCs or twist locks may be used to lock an aerodynamic pseudocontainer 140 or 160 to the corner fittings 125 of a bottom container 114a.

When the series 104 of stacked intermodal containers are received on container cars 113 attached to a locomotive 102, for example, as shown in FIG. 1, the series 104 of double stacked intermodal containers of the train 100 generally protrude a distance or a height H above the locomotive 102. For example, the height H may be five to six feet above the highest point or height of the locomotive 102. Such a height difference provides a significant source of aerodynamic drag while pulling the series 104 of containers in a forward direction (as indicated by arrow 134). As the containers are pulled in a forward direction 134, the air flow (as indicated by arrow 135) creates drag in an opposite direction. Some wind tunnel studies have shown, for example, that the first twenty percent (20%) of a train 100 produces the most drag. Thus, a transition between locomotive 102 and containers in lead container car 106 that assists in reducing the overall aerodynamic drag of the train 100 would be beneficial. Additionally, air forces or vortices may be formed around the edges of containers when moving in a forward 134 direction at high speeds. Attaching additional aerodynamic drag reducing devices to reduce the drag and vortices of the stacked intermodal containers of the train 100 while moving thus provides a plurality of benefits.

Therefore, the plurality of container cars 113 include a lead container car 106 positioned proximate the locomotive 102. The lead container car 106 comprises a single intermodal container 114a and an aerodynamic pseudocontainer 140 stacked atop the intermodal container. The term "aerodynamic pseudocontainer" herein refers to a device that is a non-freight carrying structure that mounts in place of an actual container, and that has an aerodynamic configuration or shape to reduce aerodynamic drag of a train 100. That is, it is not a container that actually carries any freight, but it mounted in place like a container—hence the term pseudocontainer. It is, in basic terms, an aerodynamic structure that is mounted as a container replacement. In an embodiment, at least one aerodynamic pseudocontainer 140 may be provided as part of the lead container car 106 to assist in reducing the amount of drag associated with the stacked intermodal containers of a moving train 100.

Figure 2:
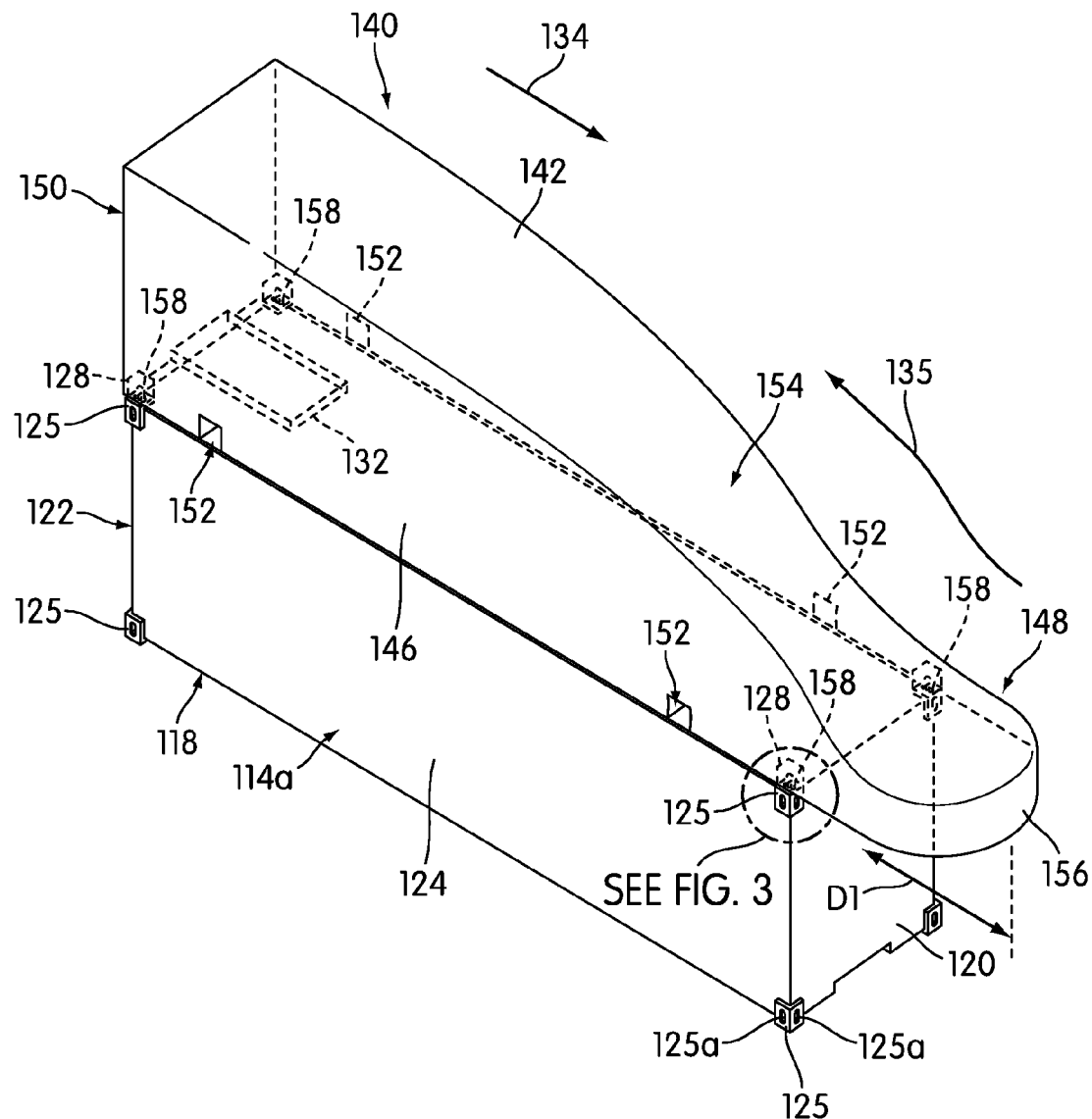
FIG. 2 illustrates a perspective view of a container having an aerodynamic pseudocontainer attached thereto in accordance with an embodiment of the present invention.

The aerodynamic pseudocontainer 140 comprises a body having an aerodynamic configuration and attachments or connectors 128. In the embodiment of FIG. 2, the pseudocontainer 140 is configured to be mounted on and attached to the top wall 116 of a leading bottom intermodal container 114a. That is, the pseudocontainer 140 and intermodal container 114a are configured to be placed in a container car 113 positioned adjacent the locomotive 102 at a lead end of the train 100, such that, as the train 100 moves in a forward direction 134, air coming up and over the locomotive 102 may be directed over at least a top portion 142 of the pseudocontainer 140 in the series 104, as represented by arrow 135, thus reducing the resistance or drag.

As shown in the embodiment of FIGS. 2-5, the aerodynamic pseudocontainer 140 comprises a top portion 142, a bottom portion 144, side portions 146, a front portion 148, and back portion 150 which are connected together to form the body, for example. In some cases, two or more of the portions 142-150 may be connected by a frame or reinforcement device (not shown). Also, though only a first (e.g., left) side portion 146 is shown in detail in the Figures, it is to be understood that the second (e.g., right) side portion 146 comprises similar features as described herein.

Figure 4:
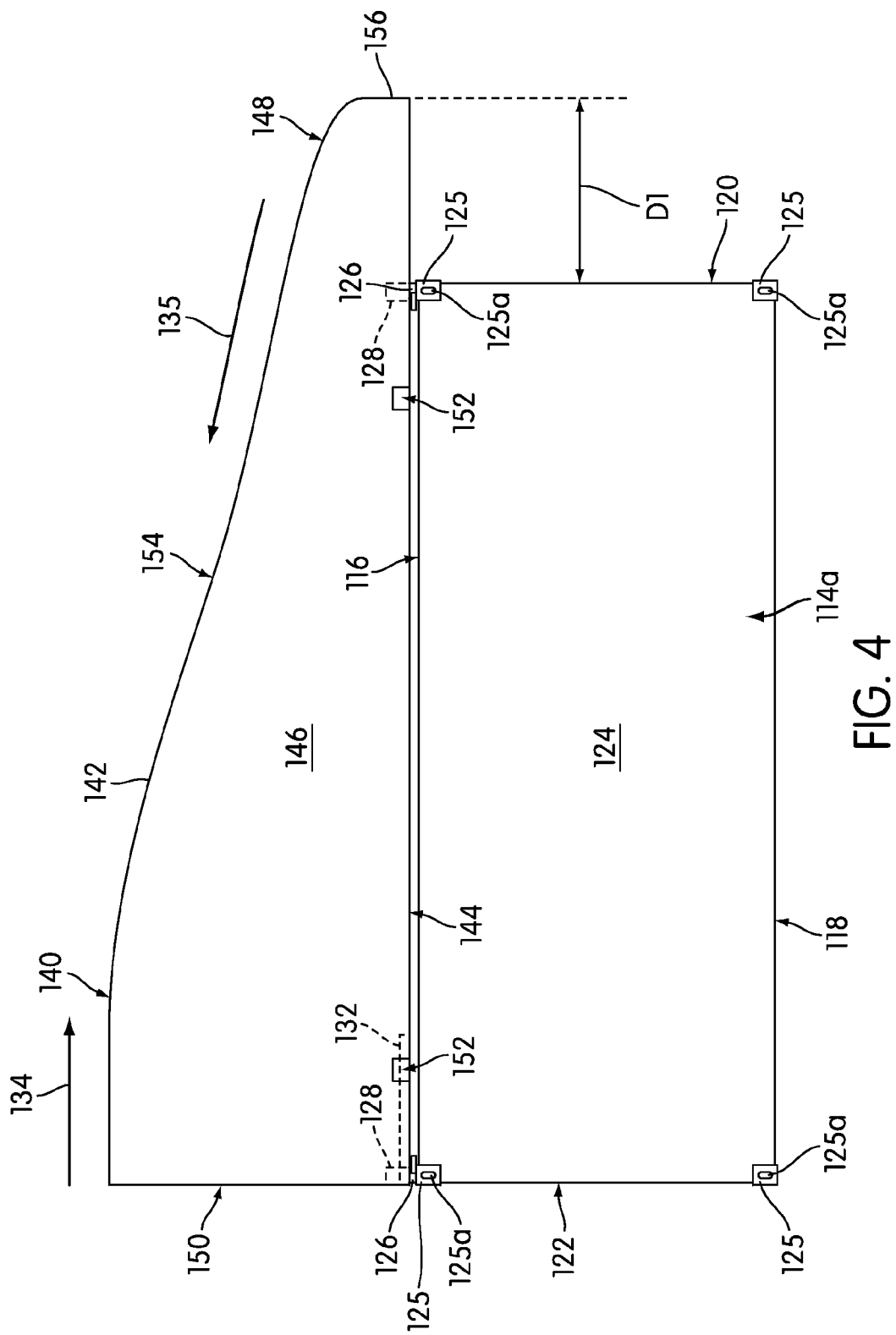
FIG. 4 illustrates a side view of the container and aerodynamic pseudocontainer of FIG. 2 in accordance with an embodiment of the present invention.
Figure 5:
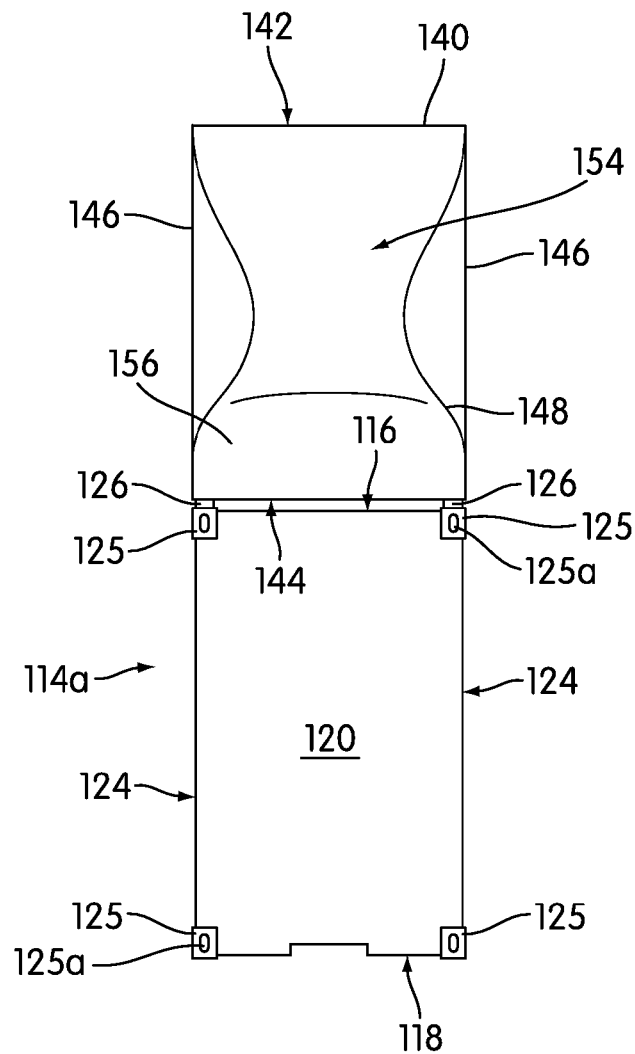
FIG. 5 illustrates a front view of the container and aerodynamic pseudocontainer of FIG. 2 in accordance with an embodiment of the present invention.

The back portion 150 is a substantially vertical portion that may be of a generally similar size (e.g., height and width) and shape to that of an intermodal container. Back portion 150 may comprise a substantially rectangular shape (e.g., rectangle or square). The front portion 148 comprises a substantially radiussed or rounded nose edge 156 formed from the top portion 142 and side portions 146. The front portion 148 and nose edge 156 comprise substantially rounded surfaces and limited corners so as to provide an aerodynamic shape. More specifically, the top portion 142 has a surface 154 that curves upwardly and longitudinally (along the length of the body) from the substantially rounded nose edge 156 of the front portion 148 to the back portion 150. As shown in FIG. 4, the surface 154 of the top portion 142 generally comprises an upwardly curved slope. Similarly, the side portions 146 comprise at least an upper edge that curves with the surface 154 of the top portion 142 from the substantially rounded nose edge 156. In some cases, such as illustrated in FIG. 5, the side portions 146 may curve concavely inwardly such that a portion adjacent the front portion 158 has a width that is narrower than a width of the bottom portion 144.

The bottom portion 144 of the pseudocontainer 140 is configured to be stacked atop the container 114a. The bottom portion 144 may comprise a substantially rectangular configuration. The bottom portion 144 may comprise, at least in part, some dimensions that are substantially similar to the dimensions of the container 114a. The base or footprint of the bottom portion 144 may be such that it may be aligned with a standard ISO container that is 40 feet in length, for example.

Figure 6:
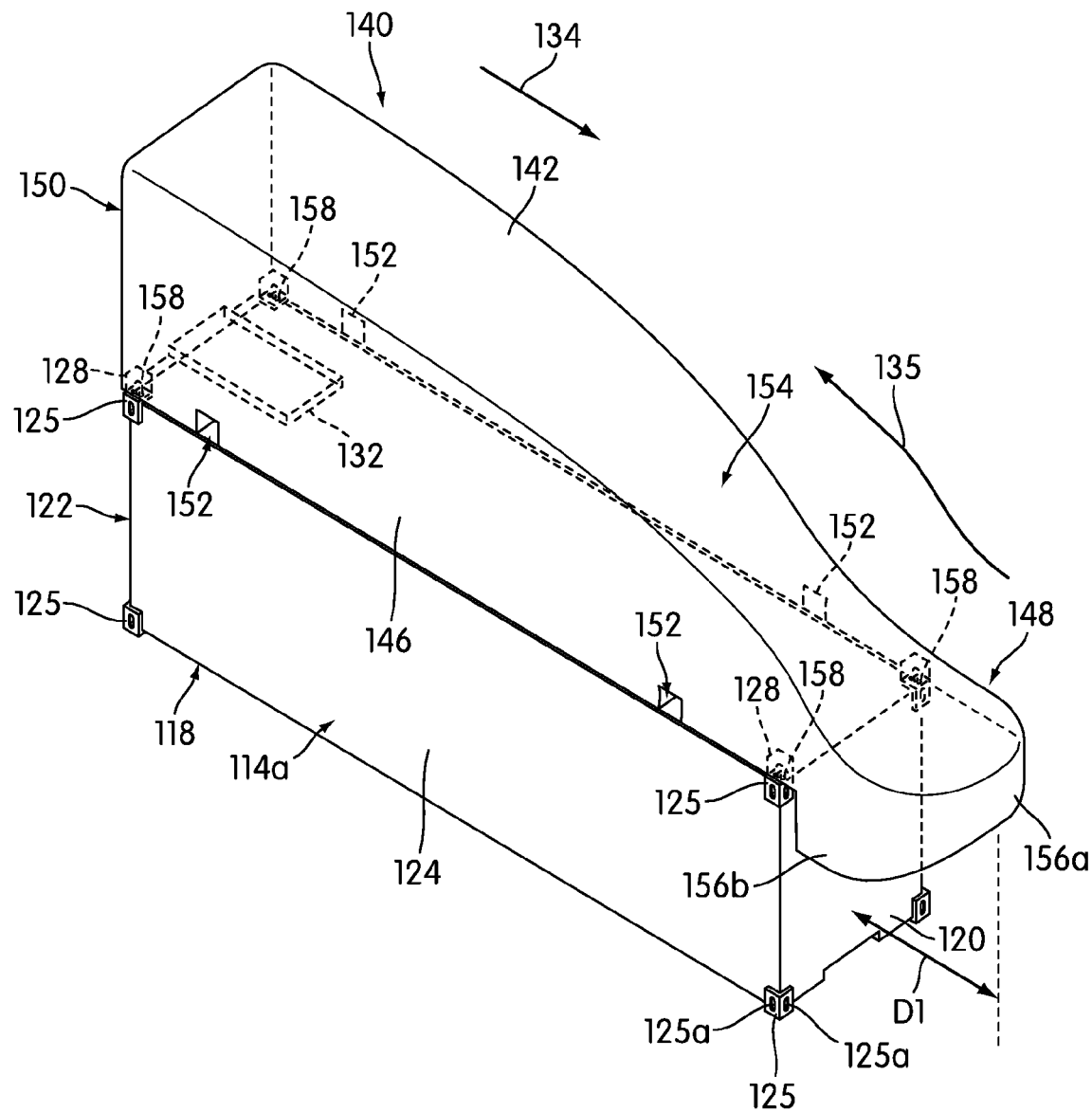
FIG. 6 illustrates a perspective view of a container having an aerodynamic pseudocontainer attached thereto such as shown in FIG. 2 with an elongated front face in accordance with an embodiment of the present invention.

The type of body used with the aerodynamic pseudocontainer 140 may include any number of shapes, sizes, and/or materials and should not be limiting. For example, in some embodiments, the body comprises at least one radiussed edge near or at its front portion 148. In some embodiments, the pseudocontainer 140 may comprise rounded edges and an downwardly extending front face such as shown in FIG. 6. For example, the pseudocontainer 140 of FIG. 6 comprises similar portions 142-150 and details (e.g., connectors 128) as described above with respect to FIGS. 2-5 and includes an alternative configuration. As shown, the edges of the pseudocontainer may be rounded or softened where each of the portions 142-150 or faces meet. The rounding of such edges may further aid in reducing drag during movement, for example. The front portion 148 may also or alternatively include a rounded nose edge 156a and a downwardly extending underhang portion 156b. The underhang portion 156b comprises an edge curving downwardly from the rounded nose edge 156a and positioned at least partially adjacent to and/or in front of the wall 120 of the container 114a. The curved surface of the underhang portion 156b may further assist in directing air away from the wall 120 and around the container 114a to reduce drag. Another example of such an embodiment is described with respect to FIGS. 7-10D, for example.

Additionally, the materials and manufacturing processes used to form the aerodynamic pseudocontainer 140 should not be limited. For example, the pseudocontainer may be formed from materials such as fiberglass, plastic film, and/or molded plastic or foam. The pseudocontainer may also be formed from multiple materials. In some embodiments, the portions of the pseudocontainer may be formed or manufactured separately and then connected together using suitable securement means or devices. In some cases, each of the portions 142-150 need not be made from the same materials. It should also be noted that it is within the scope of the invention to use a frame or reinforcement devices or securement devices for assembly of the pseudocontainer 140, and thus its assembly should not be limiting.

In an embodiment, the aerodynamic pseudocontainer 140 is designed to utilize the existing corner fittings 125 of the bottom container 114a for attachment. More specifically, the connection openings 125a of the corner fittings 125 of the leading bottom container 114a are unrestricted and provide an accessible opening for utilizing a corner locking device (such as a twisting lock 126). Utilizing the corner fittings 125 for attachment or mounting of the aerodynamic pseudocontainer 140 is beneficial as the fittings 125 are existing devices on ISO intermodal containers and no modification needs to be made to the container 114 (or its frame, if provided). In order to secure the aerodynamic pseudocontainer 140 and use the corner fittings 125 and connection openings 125a as locations for mounting, the aerodynamic pseudocontainer 140 comprises connectors 128.

The connectors 128 are designed to allow attachment or mounting of the body of pseudocontainer 140 to a bottom container such as 114a. The connectors 128 may comprise a design or configuration similar to corner fittings 125 of intermodal containers, for example. In particular, the connectors 128 may comprise one or more elongated lock-receiving openings 158 for receiving a securing, clamping, mounting, or locking device, such as locking device 126 (described further below). The lock-receiving opening(s) 158 may be a hole or aperture of circular, oval, or any other shape. In an embodiment, the opening(s) 158 are of elongated shape. The elongated opening(s) 158 may be provided on a bottom portion 144 (e.g., see FIG. 3b) or a side portion 146, for example. However, the location and designs of the opening(s) 158 and connectors 128 should not be limited. In an embodiment, connectors 128 may be manufactured using known methods such as casting. In an embodiment, connectors 128 may be made of materials such as steel or other metals. In an embodiment, connectors 128 may be molded or formed as a part of the aerodynamic pseudocontainer body. The materials and manufacturing methods used for the connectors 128 should not be limiting.

In the illustrated embodiment of FIGS. 2-5, the connectors 128 are provided in the bottom portion 144 of the aerodynamic pseudocontainer 140 at a location that allows for mounting with the corner fittings 125 of the container 114a. For example, the connectors 128 may be placed along or within the bottom portion 144 such that the connectors 128 are configured to align with the corner fittings 125, as shown in FIG. 3b. That is, the connectors 128 may be provided at a location that corresponds with the dimensions or specifications in accordance with ISO standards. In some embodiments, the connectors 128 may be placed along the bottom 144, sides 146, or a combination thereof. As such, the location of the connectors 128 should not be limiting, so as along as such sections 128 allow for the placement, mounting, and locking of the aerodynamic pseudocontainer 140 with respect to the leading, bottom container 114a.

In order to move the aerodynamic pseudocontainer 140 through a train yard and/or mount the pseudocontainer 140 on top of a container 114a, a plurality of lift points 152 may be provided in the body. For example, lift points 152 may be provided on the side portions 146 of the body. The lift points 152 may also be provided near or in a top portion 142 or near or in a bottom portion 144 of the pseudocontainer 140. In an embodiment, the lift points 152 comprise an opening extending into the body of the pseudocontainer 140. The openings of the lift points 152 may comprise any configuration, including a design similar to connection openings 125a of corner fittings 125 of an intermodal container, for example. The openings enable the aerodynamic pseudocontainer 140 to be lifted into position by the same lift equipment that may be used for lifting intermodal containers 112 or 114. For example, the lift points 152 enable the pseudocontainer to be handled (e.g., lifted, moved, etc.) using lift arms which are found on most existing container lifting spreaders or equipment (which are generally known in the art). In some cases, spreaders or such equipment may even include swinging lift arms which may be moved and stored with respect to the spreader so that container operations and movements may be performed. Thus, the lift points 152 are advantageous in that they allow for the use of existing equipment for movement and mounting on a container. Of course, the location and design of the lift points 152 should not be limited.

Figure 7:
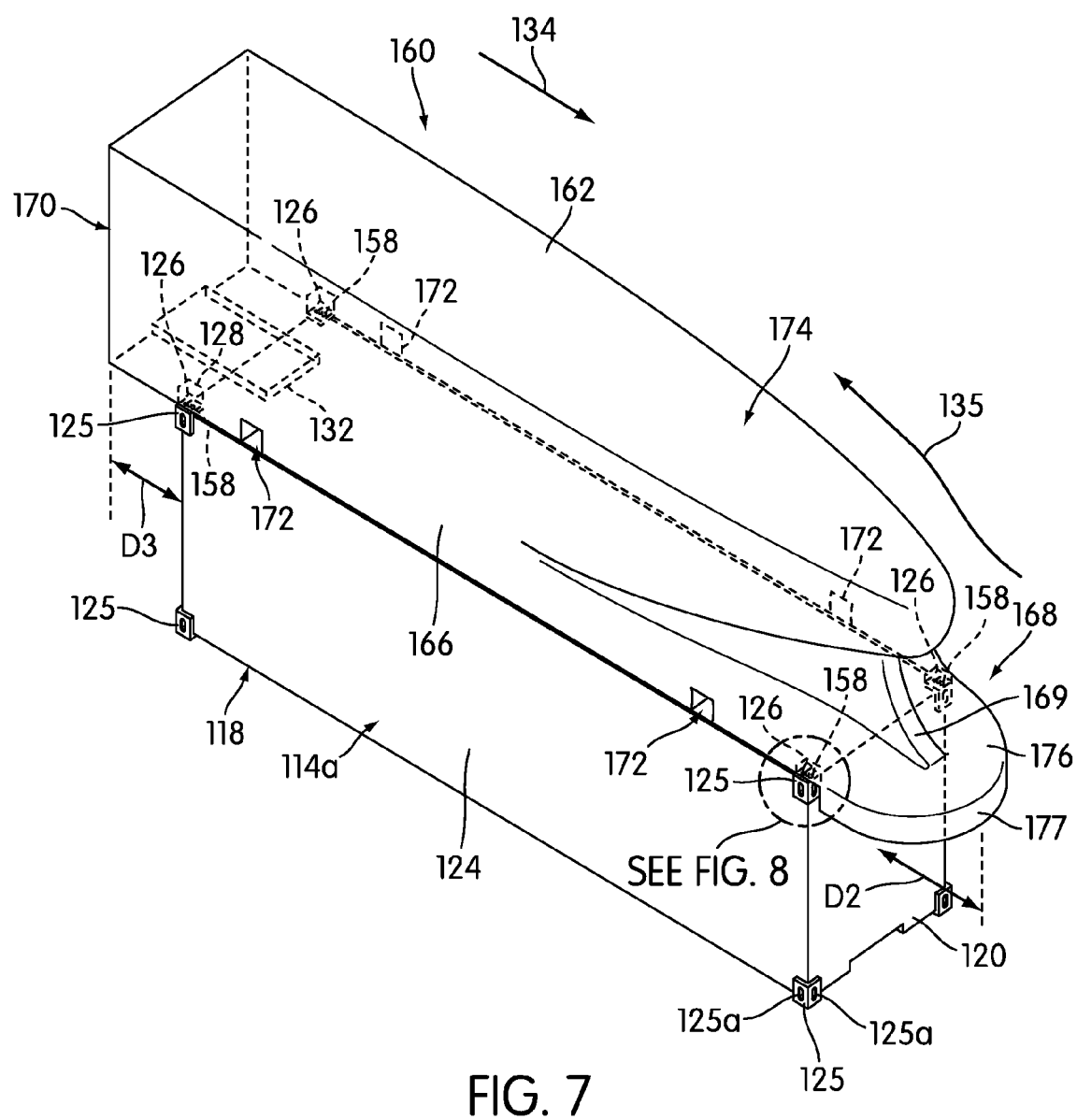
FIG. 7 illustrates a perspective view of a container having an aerodynamic pseudocontainer of alternate shape attached thereto in accordance with an embodiment of the present invention.

Also, it should be noted that when transporting the pseudocontainer 140 around the yard, for example, it may be mounted or assembled in any manner using known equipment. For example, because of the unique shape and dimensions of the pseudocontainer 140, in order to transport it on land (e.g., rather than lifting via lift points 152), a gooseneck tunnel 132 may be provided on the bottom portion 144 of the pseudocontainer. The gooseneck tunnel 132 of the pseudocontainer may be formed such that it comprises a similar configuration and/or measurements as known in the art according to ISO standards for gooseneck tunnels on containers, for example. The gooseneck tunnel 132 may be provided in relation to the back portion 150 (i.e., opposite the aerodynamically-shaped or streamlined end or front portion 148) to facilitate placement on a standard container or truck chassis trailer, and the front portion 148 may be positioned at an opposite end of the chassis, such that as it is moved about the yard, it is transported backwards (i.e., front end 148 faces and is positioning toward the rear). The placement of the gooseneck tunnel 132 and positioning on the chassis trailer is particularly useful if a protrusion or extension (such as underhang portion 156b or extension portion 177 as shown in FIGS. 6 and 7, respectively) is provided on the pseudocontainer. Of course, the location of the gooseneck tunnel should not be limiting. The pseudocontainer may be transported, moved, or mounted within the yard using known equipment, as further described below.

Figure 3B:
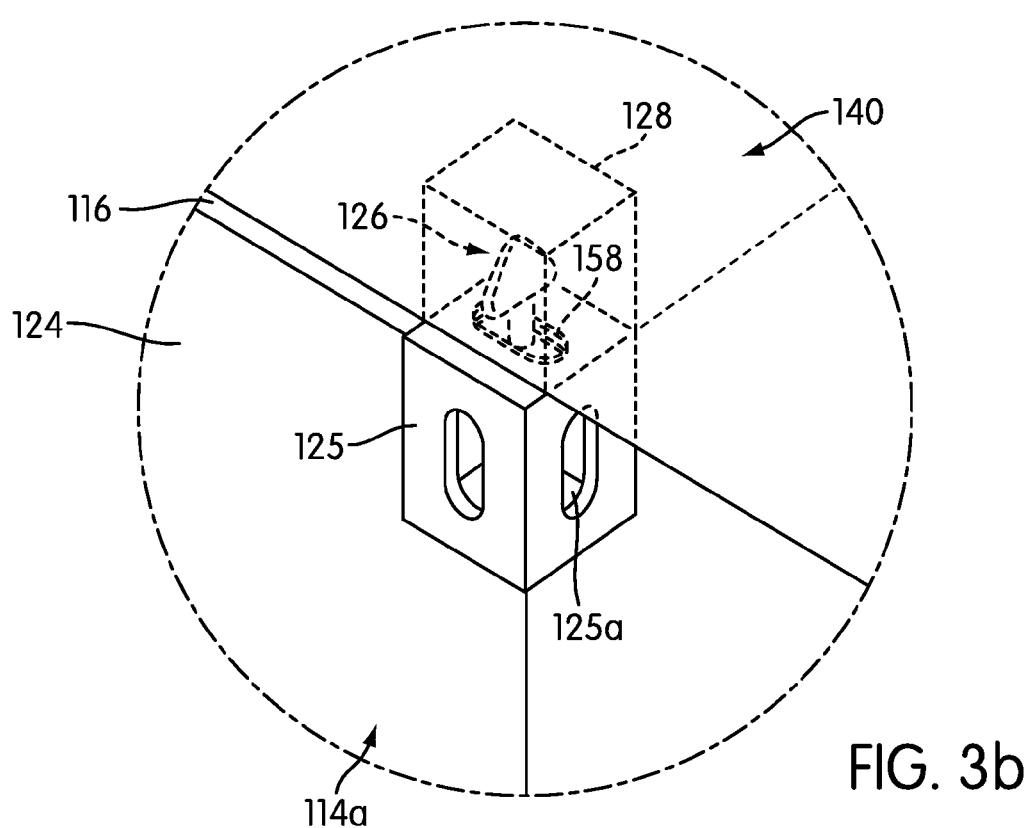

As previously noted, the aerodynamic pseudocontainer 140 may be secured to bottom container 114a using a plurality of locking devices 126. As shown in detail in FIG. 3a, each locking device 126 is such that it may be inserted and locked into a corner fitting 125 of the container 114a and correspondingly inserted and locked in the connectors 128 of the aerodynamic pseudocontainer 140 of the lead container car 106. Specifically, in an embodiment, a locking device 126 is inserted into each top connection opening 125a located along a top face (e.g., along the top wall 116) of the top corner fittings 125. The locking device 126 may be interbox connectors (IBCs) or twist lock devices that are used to attach intermodal containers to each other, as noted above. For example, the locking device 126 may comprise a rotatable base 180 and at least one rotatable locking head 182 for releasable securement. Generally, the rotatable base 180 comprises a rotatable shaft that is rotatable or pivotable in at least two directions about a substantially vertical axis. For simplicity purposes only, the base 180 is depicted as merely comprising a rotatable shaft. However, it should be noted that the base 180 may comprise any number of shapes, designs, parts, or other devices corresponding to twist locks that may pivot or rotate as is known in the art, and should not be limited to the illustrated design. The rotatable base 180 or shaft is designed to be pivoted or rotated about the vertical axis to rotate one or more locking heads 182 between an unlocked position (as shown in FIG. 3a) and a locked position (as shown in FIG. 3b). In some instances, the rotatable base 180 may comprise a toggle pin which is designed to rotate 90 degrees. More specifically, the base or toggle pin may rotated between an unlocked position (e.g., at zero degrees) and a locked position (e.g., at 90 degrees), or vice versa.

In the illustrated embodiment, one locking head 182 is shown. However, it is to be understood that a second locking head may be provided (e.g., to be rotated and locked in the opening 125a of the corner fitting 125 of the bottom container), or, alternatively, that a lockable base for insertion into the corner fittings 125 may be provided. Such methods of securing locking devices to corner fittings are known in the art. The locking devices 126 may be attached to the corner fittings 125 of the container 114a. The locking devices 126 may be locked in the fittings 125 before or after alignment of the device 140 with the bottom container 114a, and should not be limiting.

As shown in FIGS. 3a and 3b, the locking device 126 is locked within corner fitting 125, with at least a locking head 182 extending into the connection opening 128 of the pseudocontainer 140. The locking head 182 may comprise a substantially tapered, oblong shape. Locking heads 182 may be provided on either or both sides of the base 180. The locking head 182 is designed such that it may be easily inserted into the connection openings 125a of the corner fittings 125 of the container 114a, and/or inserted into the lock-receiving openings 158 of the connectors of the pseudocontainer 140. In some embodiments, the head 182 may be of substantially similar shape to that of the connection openings 125a and/or openings 128. Although the tapered, oblong shape of the locking head 182 assist in inserting and locking the locking device 126 in the corner fittings 125 and/or connectors 128, the shape of the locking head 182 should not be limited. For example, the locking head 182 may comprise a pin. Also, the base of the locking head 182 may comprise a shape that, when the locking head 182 is rotated or twisted, the base prevents the head 182 from being removed or withdrawn from openings 125a and/or openings 158.

The rotation of the locking device 126 may be manually or automatically actuated. For example, as noted, devices such as IBCs or twist locks may be used. Such devices generally comprise a handle or toggle arm for inducing rotation to one or more of the locking heads provided on the locking device 126. As such, a handle or toggle arm (not shown in the Figures) may be used to rotate one or more heads 182 of the locking devices 126 to connect/clamp within the corner fittings 125 and openings 128.

In an embodiment, any type of releasable clamping or locking device may be provided for releasably securing the aerodynamic pseudocontainer 140 to the corner fittings 125 of bottom container 114a. The releasable clamping devices may be activated in any number of ways and should not be limiting.

A lift device is used to align the aerodynamic pseudocontainer 140 on top of the bottom container 114a. The lift device may be a device that is known and/or exists in the rail or train yard, such as a spreader. For example, the lift device may comprise a spreader beam structure which is attached to and suspended by a crane (not shown). As is known in the art, the spreader beam structure may comprise a plurality of shapes. The lift device may be used to raise or lower containers as needed (e.g., such as when containers 112, 114 need to be stacked). A rotatable or twist lock device may be provided in each corner of the spreader beam structure, and the containers may be mounted or stacked in a similar manner as disclosed in U.S. patent application Ser. No. 12/259,029, to Iden et al., filed Oct. 27, 2008. Utilizing the lift device and spreader beam structure for attachment of the aerodynamic pseudocontainer 140 to a bottom container 114 is beneficial as the lift device and structure are existing devices and no modifications need to be made to lift and mount the pseudocontainer 140. Also, using such a lift device for lifting is particularly useful due to weight of the aerodynamic pseudocontainer 140. Using such equipment also reduces the amount of effort and manpower required to attach the pseudocontainer 140. For example, in some embodiments, when attaching the aerodynamic pseudocontainer 140, only a crane operator and ground operator are required.

To attach the aerodynamic pseudocontainer 140 to the top of container 114a, the lift device 154, with the pseudocontainer 140 attached thereto, is lowered by a crane operator toward the container 114a. The twist lock devices 126 extending from the bottom container 114a are aligned with the openings 158 of the connection devices 158 in the bottom portion of the aerodynamic pseudocontainer body 140. After the twist lock devices 126 are aligned, the lift device may then be lowered such that the locking heads 182 of each twist lock device 126 are inserted into the openings 158 of the connectors 128. The twist lock devices 126 are then rotated and locked, as illustrated in FIG. 3b. Specifically, the rotatable base 180 rotates about an axis A in a first direction so as to turn the locking head 182 from an unlocked position as shown in FIG. 3a to a locked position as shown in FIG. 3b (i.e., out of alignment with the openings 158). The container 114a then has the aerodynamic pseudocontainer 140 securely attached to its corner fittings 125.

FIGS. 7-10D illustrate views of a bottom intermodal container 114a having an aerodynamic pseudocontainer 160 of alternate shape attached thereto in accordance with an embodiment of the present invention. In a similar manner to pseudocontainer 140, aerodynamic pseudocontainer 160 comprises a body having an aerodynamic configuration and attachments or connectors 128. In the embodiment of FIG. 7, the pseudocontainer 160 is mounted on and attached to the top wall 116 of the leading bottom intermodal container 114a of the lead container car 106, such that, as the train 100 moves in a forward direction 134, air coming up and over the locomotive 102 may be directed over at least a top portion 162 of the pseudocontainer 160, as represented by arrow 135, thus reducing the resistance or drag.

Similarly, the aerodynamic pseudocontainer 160 comprises a top portion 162, a bottom portion 164, side portions 166, a front portion 168, and back portion 170 which are connected together to form the body, for example. In some cases, two or more of the portions 162-170 may be connected by a frame or reinforcement device (not shown). Also, though only a first (e.g., left) side portion 166 is shown in detail in the Figures, it is to be understood that the second (e.g., right) side portion 166 comprises similar features as described herein.

Figure 9:
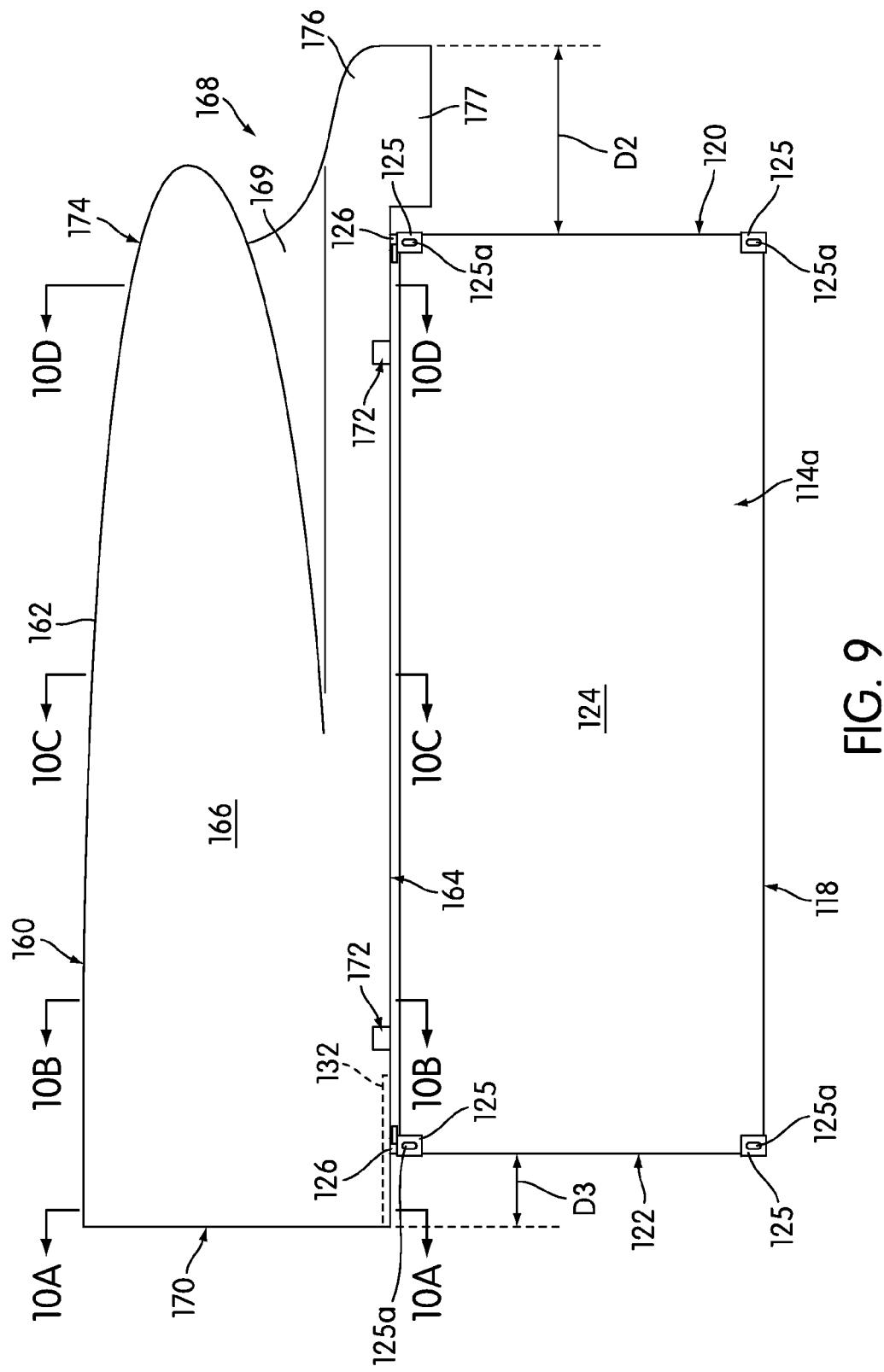
FIG. 9 illustrates a side view of the container and aerodynamic pseudocontainer of FIG. 7 in accordance with an embodiment of the present invention.
Figure 10A:
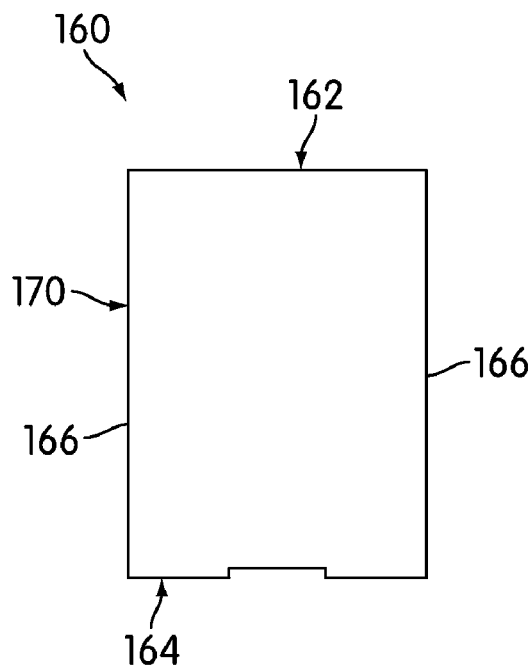
FIGS. 10A-10D illustrate cut-out views along the aerodynamic pseudocontainer of FIG. 7 in accordance with an embodiment of the present invention.
Figure 10B:
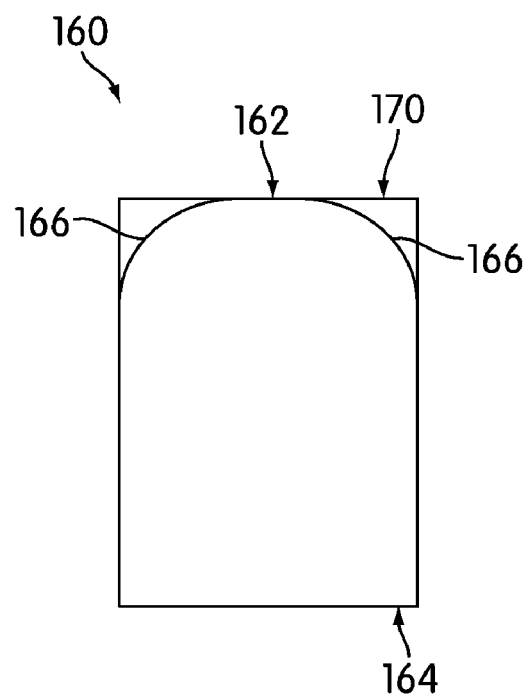
Figure 10C:
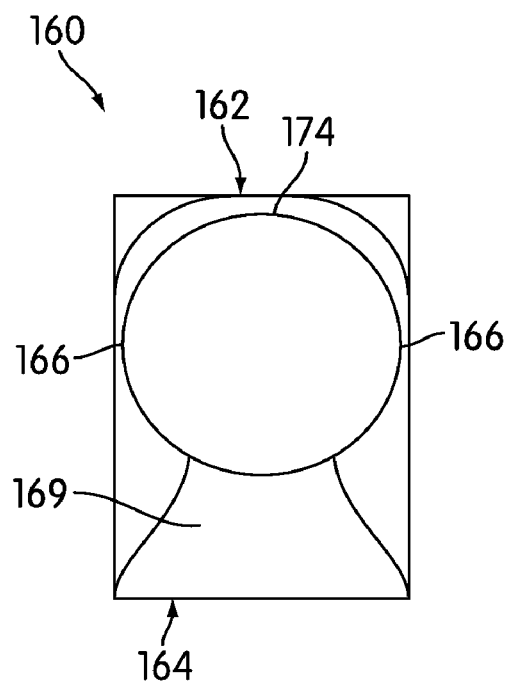
Figure 10D:
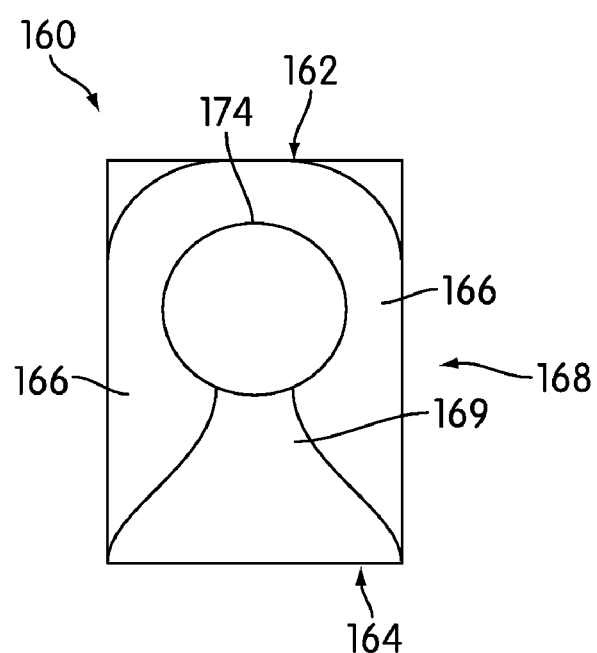

The back portion 170 is a substantially vertical portion that may be of a generally similar size (e.g., height and width) and shape to that of an internodal container. Back portion 170 may comprise a substantially rectangular shape (e.g., rectangle or square). The front portion 168 of this embodiment comprises a substantially radiussed or rounded, "bullet-shaped" nose 174 and a substantially rounded front edge 176 formed from the top portion 162 and side portions 166. The front portion 168, nose edge 174, and front edge 176 comprise substantially rounded surfaces and limited corner so as to provide an aerodynamic shape. More specifically, the top portion 162 narrows or tapers longitudinally towards the front portion 168 from the back portion 170, such as shown in FIG. 9. Similarly, the side portions 166 comprise at least an edge that curves and narrows or tapers with the surface of the top portion 162 (toward the substantially rounded front edge 176), as illustrated by the cross-sections of the pseudocontainer 160 shown in FIGS. 10A-10D. Thus, a bullet-shaped nose 174 is formed.

The nose 174 is provided in spaced relation above the front edge 176. A substantially vertical beam member 169 may be provided therebetween. For example, beam member 169 may curve upwardly from an upper surface of the front edge 176 toward a lower surface of the nose 174. The substantially vertical beam member 169 may comprise rounded surfaces and/or edges. The beam member 169 may comprise surfaces that curve inwardly toward the nose 174, as well as outwardly into side portions 166.

The front edge 176 of the front portion 168 may also comprise a downward extension portion 177. As shown in FIG. 9, the front portion 168 may extend a distance D2 forwardly from a front wall 120 of the container 114a when stacked thereon (further noted below). The downward extension portion 177 comprises an edge curving downwardly at least partially adjacent to and/or in front of the wall 120 of the container 114. The curved surface of the downward extension portion 177 may further assist in directing air away from the wall 120 and around the container 114a, thereby further reducing drag.

The bottom portion 164 of the pseudocontainer 160 is configured to be stacked atop the container 114a. The bottom portion 164 may comprise a substantially rectangular configuration. The bottom portion 164 may comprise, at least in part, some dimensions that are substantially similar to the dimensions of the container 114a. The base or footprint of the bottom portion 164 may be such that it may be aligned with a standard ISO container that is 40 feet in length, for example. As will become evident, such dimensions or footprint is advantageous, as the dimensions for a 40 foot ISO intermodal container are substantially identical to those of any 45, 48, or 53 foot container with respect to the corner fitting locations.

The materials and manufacturing processes used to form the aerodynamic pseudocontainer 160 should not be limited. For example, the pseudocontainer may be formed for materials such as fiberglass, plastic film, and/or molded plastic or foam. The pseudocontainer may also be formed from multiple materials. In some embodiments, the portions of the pseudocontainer may be formed or manufactured separately and then connected together using suitable securement means or devices. In some cases, each of the portions 162-170 and 174-176 need not be made from the same materials. It should also be noted that it is within the scope of the invention to use a frame or reinforcement devices or securement devices for assembly of the pseudocontainer 160, and thus its assembly should not be limiting.

Figure 8B:
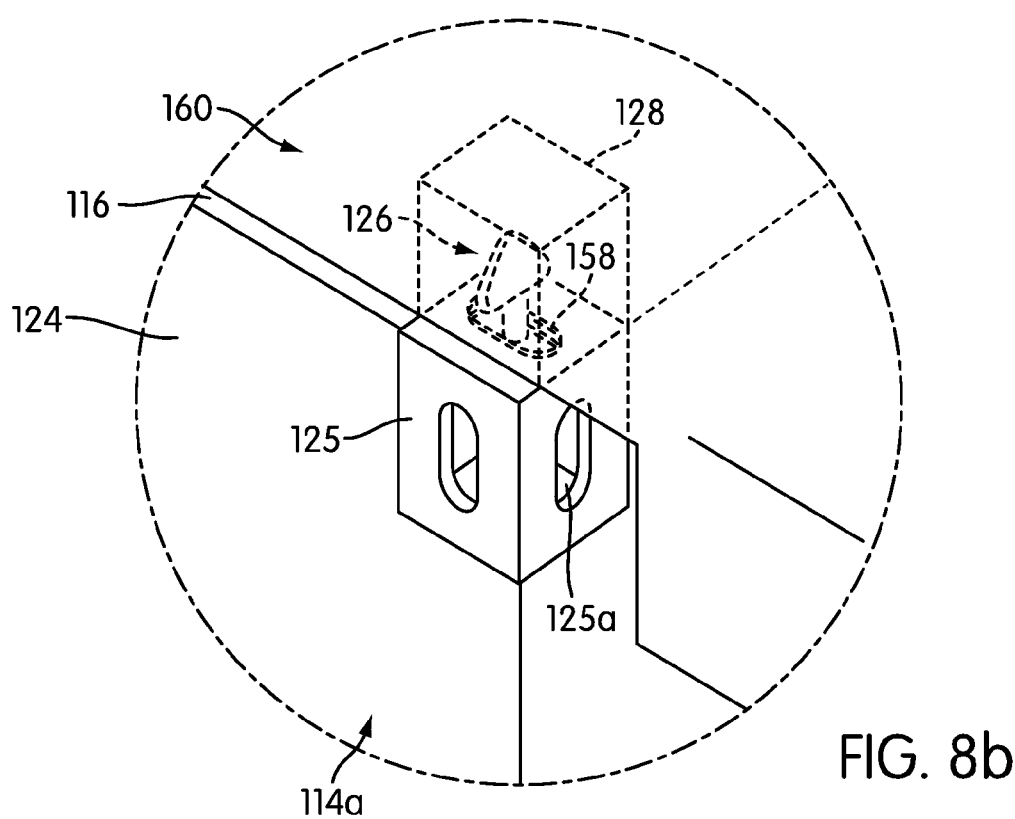

Additionally, in an embodiment, the aerodynamic pseudocontainer 160 is designed to utilize the existing corner fittings 125 of the bottom container 114a for mounting thereon. Thus, FIGS. 8a and 8b illustrate aerodynamic pseudocontainer 160 comprising similar connectors 128 as described with respect to FIGS. 3a and 3b. Also, aerodynamic pseudocontainer 160 may utilize locking devices 126 for mounting and securing to the bottom container 114a. That is the locking devices 126 may be inserted and locked into a corner fitting 125 of the container 114a and correspondingly inserted and locked in the connectors 128 of the aerodynamic pseudocontainer 160. Such description is provided above with respect to FIGS. 2-5, and illustrated in FIGS. 7-9, and is therefore not repeated at this point.

In order to move the aerodynamic pseudocontainer 160 through a train yard and/or mount the pseudocontainer 160 on top of a container 114a, a plurality of lift points 172 may also be provided in the body. For example, lift points 172 may be provided on the side portions 166 of the body. The lift points 172 may also be provided near or in a top portion 162 or near or in a bottom portion 164 of the pseudocontainer 160. In an embodiment, the lift points 172 comprise an opening extending into the body of the pseudocontainer 160. The openings of the lift points 172 may comprise any configuration, including a design similar to connection openings 125a of corner fittings 125 of an intermodal container, for example. The openings enable the aerodynamic pseudocontainer 160 to be lifted into position by the same existing lift equipment that may be used for lifting intermodal containers 112 or 114, such as a spreader (described above with respect to FIGS. 2-5). However, the location and design of the lift points 172 should not be limited.

Also, it should be noted that when transporting the pseudocontainer 160 around the yard, for example, it may be mounted or assembled for transportation via a gooseneck tunnel 132 provided in the bottom portion 144 of the pseudocontainer 160 (in any location) using known equipment (e.g., chassis trailer), such as described above with respect to pseudocontainer 140.

The aerodynamic pseudocontainer provides several advantageous features. For example, an aerodynamic pseudocontainer such as pseudocontainer 140 securely attached to an intermodal container 114 in a lead container car 106 will significantly reduce aerodynamic drag at a front end of the train when moving in a forward direction 134. Such a reduction in aerodynamic drag and vortices thus provides the potential to reducing fuel consumption. For example, a small reduction in fuel consumption for a large railroad company, such as one percent (1%), may equate to a very large reduction of the overall amount of fuel or gas used annually for a large rail operator. Therefore, the aerodynamic pseudocontainer also aids in improving the fuel efficiency of the train 100, as well as increase the travel range (distance).

Additionally, the aerodynamic pseudocontainer provides a reduction in the amount of exhaust emissions per unit transportation-work performed. Also, it should be noted that although pseudocontainer is a "false" device, i.e., is a non-revenue generating structure that does not carry goods, the pseudocontainer still provides cost reduction benefits when used because of its aerodynamic configuration to reduce air drag. In any event, it is estimated that the amount of fuel savings produced based on the reduction in air drag or resistance will generally outweigh the revenue lost by not carrying a revenue generating container as a top container in the lead container car 106.

Further, an additional potential benefit of the aerodynamic pseudocontainers 140 or 160 is that the pseudocontainer may be used to incorporate additional equipment and technology thereon. For example, air-operated flaps or spoilers may be placed on an exterior of a rear-half portion of the aerodynamic pseudocontainer 140, 160. Such devices as the flaps or spoilers may be permanently attached or selectively activated. In some embodiments, the activation of such aerodynamic drag reducing devices may be a result of a control command caused by the use of a braking device (e.g., electronically-controlled pneumatic (ECP) braking train line cable). The activation of such devices could reduce the aerodynamic advantage the aerodynamic pseudocontainer 140, as the devices would increase resistance. These devices may be utilized during events such as during train braking maneuvers to reduce wear-and-tear on freight car brake shoes when slowing or stopping the movement of the train 100, for example. Thus, in some embodiments, the aerodynamic pseudocontainer 140 or 160 may serve to both reduce aerodynamic drag and use increased aerodynamic drag to supplement train air braking.

The aerodynamic pseudocontainer 140, 160 is also advantageous as it is designed such that it may be easy to install by operators as the bottom container 114a, 114a to which it is mounted need not be adjusted or modified since it uses existing holes and openings (e.g., corner fittings 125) and equipment (e.g., lift device and spreader beam). The pseudocontainer 140, 160 also allows for simplified installation (or removal) without risk of harm or injury to the body, the pseudocontainer, or the operators. In an embodiment, the aerodynamic pseudocontainer 140, 160 may be a removable structure that may be attached to any number of containers in a set of stacked intermodal containers.

The use of the locking devices 126 also provide several advantages. As noted above, the locking devices 126 comprise structures (i.e., twist locks) that are generally known in the art. As such, additional devices need not be manufactured, and use of such devices need not be learned. Also, the pseudocontainer 140, 160 itself may be also low in cost to produce.

In addition to the above noted advantages, the aerodynamic pseudocontainers 140 and 160 described above are advantageous as they are designed to be placed atop the intermodal container 114. It is estimated that the use of such a pseudocontainer 140, 160 may increase the reduction of resistance or drag by approximately fifty percent (50%) as compared to other fairings or devices that may be attached just to a face or edge of a container, for example. In some cases, it is estimated that pseudocontainers 140, 160 may provide approximately twelve percent (12%) reduction in the amount of drag on a train.

Moreover, the aerodynamic pseudocontainers 140, 160 may be attached to intermodal containers of various sizes (e.g., 40, 45, 48 or 53 feet in length). As noted, a bottom container 114 is placed in a well of the car 113, and the pseudocontainer 140 or 160 is seated and mounted/locked with respect to its top wall 116. However, the mounting of the aerodynamic pseudocontainer 140 or 160 need not be adjusted and is not affected, as the pseudocontainers 140, 160 may be easily aligned to fit intermodal containers of differing dimensions. For example, as noted previously, intermodal containers may comprise corner fittings 125 at or near a corner of its body. In some cases, such intermodal containers of greater length may comprise two sets of corner fittings. Each set of corner fittings may be substantially equivalent to corner fittings 125 as described above, and are generally known in the art. Because the spacing between the connection openings 125a in each corner fitting 125 on the front wall 120 and back wall 122 are set via ISO standards (e.g., 7 feet, 4 and 31/32 inches), and all of the ISO containers have corner fittings 125 at such locations, the mounting of the aerodynamic pseudocontainer (using the connectors 128) requires little adjustment. Thus, the aerodynamic pseudocontainers 140, 160 as provided herein may be attached to any size container having a plurality of corner fittings. For simplicity purposes only, however, the containers 114a as shown in the Figures illustrate a single set of corner fittings 125 provided in each corner of the container.

For example, referring to FIGS. 2-5, in an embodiment, the bottom container 114a may be a container comprising a length of 40 feet. As such, in an embodiment, the aerodynamic pseudocontainer 140 may comprise a length and connection openings 128 to be mounted on the container 114a. Once the aerodynamic pseudocontainer 140 and container 114a are connected together, a substantial amount of the body of pseudocontainer 140 overlies the bottom container 114a. However, a front portion 148 of the aerodynamic pseudocontainer 140 may overhang a distance D1 with respect to the bottom container 114a. Specifically, as shown in FIGS. 2 and 4, for example, the front portions extends distance D1 forwardly from the front wall 120 of the intermodal container 114a when stacked thereon. The overall length or clearance required for attaching the lead container car 106 to the locomotive 102 or another container car 113 (e.g., via couplings) thus increases by a distance D1.

In some embodiments, the front, substantially rounded nose edge 156 (or 156a) may overhang distance D1 forward of the front wall 120 of the bottom container 114a. In some cases, the distance D1 is determined based on a distance between the lead container car 106 and a back of the locomotive 102, for example; that is, the distance D1 should be less than that distance. In some embodiments, the distance D1 may be approximately 4 feet to approximately 6 feet. In an embodiment, the pseudocontainer 140 may increase the overall length needed for clearance of the lead container car 106 up to and including approximately 7 feet. Of course, the pseudocontainer 140 may be shaped such that it extends or overhangs with respect to the front wall 120 or the back wall 122 of the container 114, and the amount of overhang distance or its extension should not be limiting.

In some embodiments, when the connectors 128 of the aerodynamic pseudocontainer are aligned with the corner fittings 125 of the bottom container 114, the overhang distance may vary. Such an embodiment is shown with respect to aerodynamic pseudocontainer 160 in FIGS. 7-9, for example. The aerodynamic pseudocontainer 160 may comprise a length with connection openings 128 at a location associated with ISO specifications, but whose overhang distance varies with respect to the size of the intermodal container 114a it is mounted thereon.

For example, as shown, the pseudocontainer 160 may have a front portion 168 that extends a front overhang distance D2 forwardly from the front wall 120 of the container 114a, and a back portion 170 that extends a rear overhang distance D3 rearwardly from the back wall 122 of the container 114a. Because the container 114a may comprise any number of sizes or lengths, the overhang distances D2 and D3 may be variable. In an embodiment, should the container 114a be a container that is 40 feet in length, the front overhang distance D2 may comprise a length of up to and including approximately 7 feet, and the rear overhang distance may comprise a length of approximately 0 feet. That is, the pseudocontainer may be designed such that the back portion is substantially flush with the back wall of the container (e.g., such as shown in FIG. 2). Alternatively, in some embodiments, the distances D2 and D3 may vary. For example, should the container 114a be a standard ISO container of larger size, i.e., 45 feet, 48 feet, or 53 feet, the overhang distances D2 and D3 may vary. In some cases, the front overhang distance D2 may be configured such that the distance D2 is a fixed length, e.g., up to and including approximately 7 feet, while the rear overhang distance D3 varies in length and is dependent upon the length of the container 114a the pseudocontainer is mounted on. As such, the overall length needed for clearance as the lead container car 106 may also be adjusted.

As an example, as shown in the chart below, the front overhang distance D2 may be set to a fixed length, e.g., 7 feet, while the rear overhang distance D3 and/or the overhang length needed for proper clearance of the lead container car may vary according to the size of the chosen container:

| Intermodal Container Length (Container 114a) | Front Overhang Distance D2 of Pseudocontainer | Rear Overhang Distance D3 of Pseudocontainer | Overall Length Needed for Lead Container Car 106 |
|---|---|---|---|
| 40' | up to approx. 7'0" | 0'0" | up to approx. 47'0" |
| 45' | up to approx. 7'0" | up to approx. 5'0" | up to approx. 52'0" |
| 48' | up to approx. 7'0" | up to approx. 8'0" | up to approx. 55'0" |
| 53' | up to approx. 7'0" | up to approx. 13'0" | up to approx. 60'0" |

Alternatively, it is envisioned that the rear overhang distance D3 may be a fixed length, while the front overhang distance D2 of the pseudocontainer varies based on the length of the container 114a it is mounted on. Of course, such distances and clearances noted above with respect to the pseudocontainer and/or lead container car 106 should not be limiting, and may be adjusted.

Additionally, it should be noted that it is envisioned in other embodiments that the aerodynamic pseudocontainer 140 and/or 160 may be attached to a back or second end of a train 100 as well. For example, in addition or alternatively to the intermodal wedge pseudocontainer 140 on the lead container car 106, FIG. 1 also illustrates a perspective view of a second or trailing aerodynamic pseudocontainer 130 attached to a top wall 116 of a bottom container 114 of a trailing container car 108, which may be used in accordance with an embodiment of the present invention, to reduce the aerodynamic drag provided by a rear section of the train 100. The trailing aerodynamic pseudocontainer 130 may comprise a body having an aerodynamic shape that is substantially similar to that of pseudocontainer 140, pseudocontainer 160, or some other aerodynamic shape for reducing drag. The trailing pseudocontainer 130 also reduces the vortices, suction or vacuum effects which may be produced by the air flow 135 when the train 100 or series 104 of stacked intermodal containers are moving in a forward direction 134. In an embodiment, the second or trailing aerodynamic pseudocontainer 130 may comprise a similar structure as the front-mounted aerodynamic drag reducing devices 140 or 160 as described above. For example, the pseudocontainer 130 may be designed to comprise a body and connectors for receiving twist locks therein. The pseudocontainer 130 may be stacked atop an intermodal container 114. The connectors may be aligned with twist locks which are inserted from the corner fittings 125 of the bottom container 114 to mount the pseudocontainer 130 to a container 114. For example, the mounting of pseudocontainer 130 may be performed in a similar manner as described with respect to the aerodynamic pseudocontainer 140, and/or may use similar attachment structures (including the locking devices 126) for securement with the corner fittings 125. The pseudocontainer 130 and intermodal container 114 may be provided in the trailing container car 108 and positioned at a distal end of the train 100.

While the principles of the invention have been made clear in the illustrative embodiments set forth above, it will be apparent to those skilled in the art that various modifications may be made to the structure, arrangement, proportion, elements, materials, and components used in the practice of the invention.

For example, locking devices 126 may be retractable. Also, the directions and ranges of which the devices may twist, rotate, or pivot should not be limiting. In some embodiments, one or more devices may be provided on an intermodal container and/or aerodynamic pseudocontainer to prevent movement of the locking devices 126 from a locked position (or unlocked position). Such device(s) would be particularly advantageous during movement transport of the containers by the train 100, as some movements may accidentally or inadvertently rotate or unlock the locking devices 126. In some embodiments, handles or toggle arms for rotating the devices may be permanently attached to each locking device. In some cases, alternate locking devices 126 may be provided. For example, locking devices 126 which may connect the pseudocontainer and intermodal container using side portions or side openings of the fittings 125 or connectors 128 is envisioned. Additionally, it is envisioned that a combination of locking devices may be used to secure the pseudocontainer to the intermodal container.

It is also envisioned that, in some instances, the connectors 128 may be used to assist in moving, attaching, or mounting the pseudocontainer in the yard. The connectors 128 may be used along or in combination with lift points 152 or 172, for example.

Also, additional aerodynamic reducing devices, such as curtains 200 shown in FIG. 1, may be used with train 100. Curtains 200 generally have a first end attached to back walls 122 of a set of containers and a second end attached to front walls 120 of a second set of containers. The curtains 200 may comprise any sort of design or shape and may be attached any number of ways to the containers. The curtains 200 may be used to further reduce aerodynamic drag that may occur adjacent or around the containers as the train 100 moves in a forward direction 134.

It should also be noted that it is within the scope of the invention that the aerodynamic pseudocontainers 130, 140, 160 and/or curtains 200 described herein may be used individually or in combination with each other. Also, it is within the scope of the invention that the aerodynamic pseudocontainers 130, 140, 160 may be used individually or in combination with other devices, such as aerodynamic drag reducing devices designed for application to containers or stacked containers, such as those as disclosed in U.S. patent application Ser. No. 12/118,393 to Iden et al., filed on May 9, 2008, or U.S. patent application Ser. No. 12/259,029 to Iden et al., filed on Oct. 27, 2008, and/or aerodynamic drag reducing devices designed for application to locomotives, such as those disclosed in U.S. patent application Ser. No. 12/490,966 to Iden, filed on Jun. 24, 2009, all of which are herein incorporated by reference in their entirety.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An aerodynamic pseudocontainer for reducing aerodynamic drag associated with a train, the pseudocontainer comprising:
    a non-freight carrying body configured to be stacked atop an intermodal container;
    a bottom portion of the body configured to be stacked and aligned atop the intermodal container;
    a plurality of connectors on the body for connecting the body to the intermodal container, the connectors configured to be substantially aligned with corner fittings of the intermodal container; and
    wherein the body of the pseudocontainer comprises an aerodynamic configuration for reducing drag when the train is in motion.

2. An aerodynamic pseudocontainer according to claim 1, wherein the plurality of connectors are provided on the bottom portion.

3. An aerodynamic pseudocontainer according to claim 1, wherein the aerodynamic configuration comprises a shape that tapers toward a front portion of the pseudocontainer.

4. An aerodynamic pseudocontainer according to claim 1, wherein the body of the pseudocontainer extends a distance forwardly of the intermodal container when stacked thereon.

5. An aerodynamic pseudocontainer according to claim 1, wherein the body of the pseudocontainer extends a distance rearwardly of the intermodal container when stacked thereon.

6. An aerodynamic pseudocontainer according to claim 4, wherein the distance is less than or equal to approximately 7 feet.

7. An aerodynamic pseudocontainer according to claim 1, wherein the body of the pseudocontainer further comprises a downwardly extending portion positioned at least partially adjacent a front wall of the intermodal container to assist in directing air away from and around the intermodal container to further reduce drag.

8. A train comprising:
   a locomotive having track engaging wheels for pulling the train along a pair of tracks, the locomotive being located at a lead end of the train;
   a plurality of container cars coupled rearward of the locomotive, each container car comprising track engaging wheels, wherein one or more of the container cars comprises a set of intermodal containers stacked one atop each other;
   the plurality of container cars including a lead container car positioned proximate the locomotive, the lead container car comprising a single intermodal container and an aerodynamic pseudocontainer stacked atop the intermodal container;
   the aerodynamic pseudocontainer comprising a non-freight carrying structure, and
   wherein the aerodynamic pseudocontainer extends higher than the locomotive and has an aerodynamic configuration for reducing drag as the train is pulled forwardly by the locomotive.

9. A train according to claim 8, wherein the single intermodal container and the aerodynamic pseudocontainer are attached together using a plurality of locking devices.

10. A train according to claim 9, wherein the intermodal container comprises corner fittings with connection openings and the aerodynamic pseudocontainer comprises connectors having lock-receiving openings, and wherein the plurality of locking devices are secured in the connection openings and lock-receiving openings.

11. A train according to claim 10, wherein each locking device comprises a rotatable locking device for releasably securing the locking device in the connection openings and lock-receiving openings by rotating the rotatable locking device.

12. A train according to claim 8, wherein the body of the pseudocontainer extends a distance forwardly of the single intermodal container when stacked thereon.

13. A train according to claim 12, wherein the distance is determined based on a measured length between the locomotive and the lead container car.

14. A train according to claim 8, wherein the body of the pseudocontainer further comprises a downwardly extending portion positioned at least partially adjacent a front wall of the single intermodal container to assist in directing air away from and around the single intermodal container to further reduce drag.

15. A method of reducing aerodynamic drag of a train, the train comprising: a locomotive having track engaging wheels for pulling the train along a pair of tracks, the locomotive being located at a lead end of the train; a plurality of container cars coupled rearward of the locomotive, each container car comprising track engaging wheels, wherein one or more of the container cars comprises a set of intermodal containers stacked one atop each other; the plurality of container cars including a lead container car positioned proximate the locomotive; the method comprising:
   providing the lead container car with a single intermodal container; and
   stacking a non-freight carrying aerodynamic pseudocontainer atop the single intermodal container,
   wherein the aerodynamic pseudocontainer extends higher than the locomotive and has an aerodynamic configuration for reducing drag as the train is pulled forwardly by the locomotive.

16. A method according to claim 15, further comprising:
   attaching the single intermodal container and the aerodynamic pseudocontainer together using a plurality of locking devices.

17. A method according to claim 16, wherein the single intermodal container comprises corner fittings with connection openings, and the aerodynamic pseudocontainer further comprises connectors having lock-receiving openings; and the method further comprising:
   inserting the plurality of locking devices into the connection openings and lock-receiving openings, and securing the locking devices therein.

18. A method according to claim 17, wherein the plurality of locking devices are configured to be removably mounted to the connection openings located in top corners of the single intermodal container.

19. A method according to claim 17, further comprising securing the plurality of locking devices in the connection openings and lock-receiving openings by rotating a rotatable locking device.

* * * * *